E. R. YOUNG.
GASOLENE GAGE FOR AUTOMOBILES.
APPLICATION FILED DEC. 13, 1913.
1,121,441.
Patented Dec. 15, 1914.
2 SHEETS—SHEET 1.
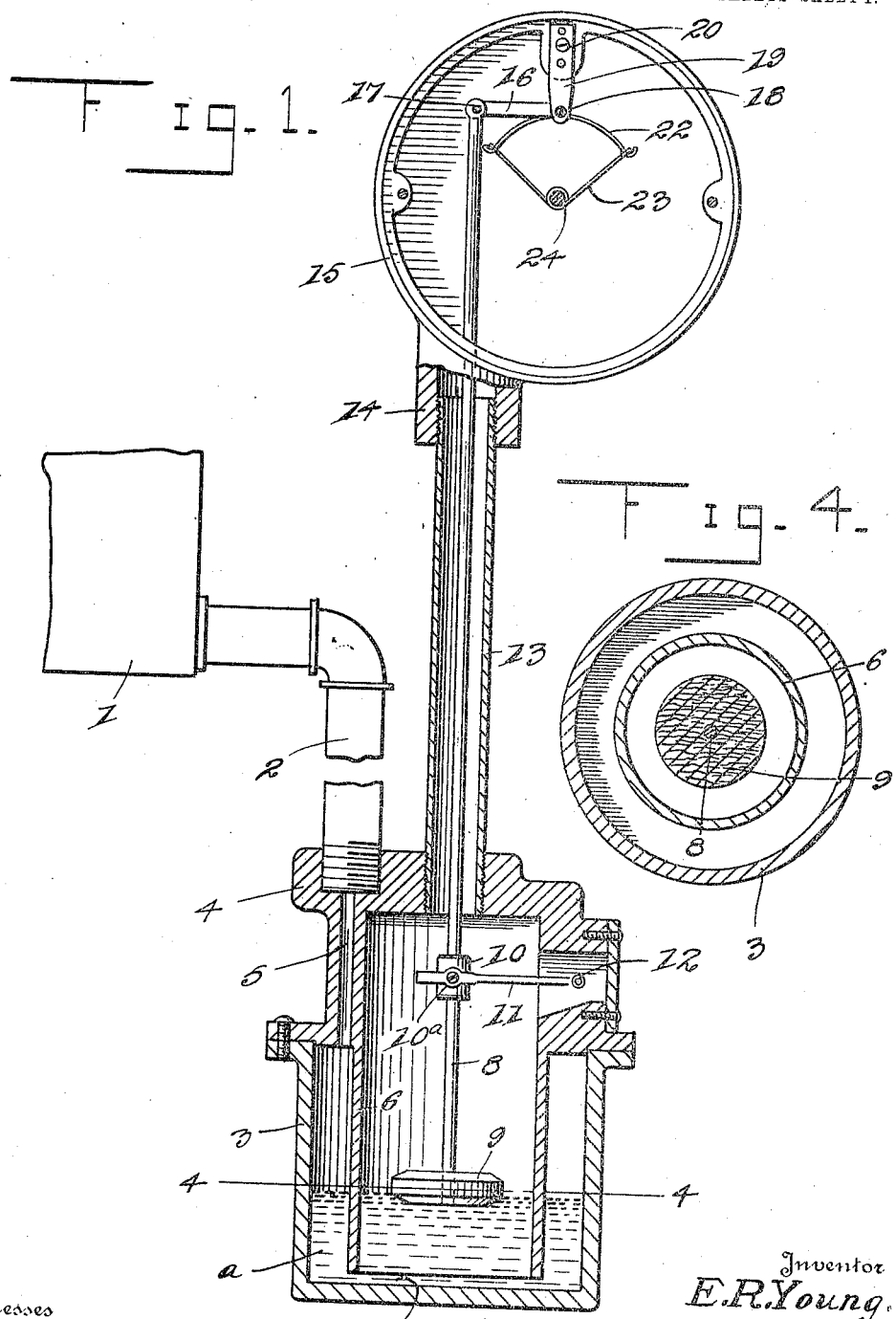
Witnesses
Inventor
E. R. Young.
By
Attorney E. R. YOUNG.
GASOLENE GAGE FOR AUTOMOBILES.
APPLICATION FILED DEC. 13, 1913.
1,121,441.
Patented Dec. 15, 1914.
2 SHEETS—SHEET 2.
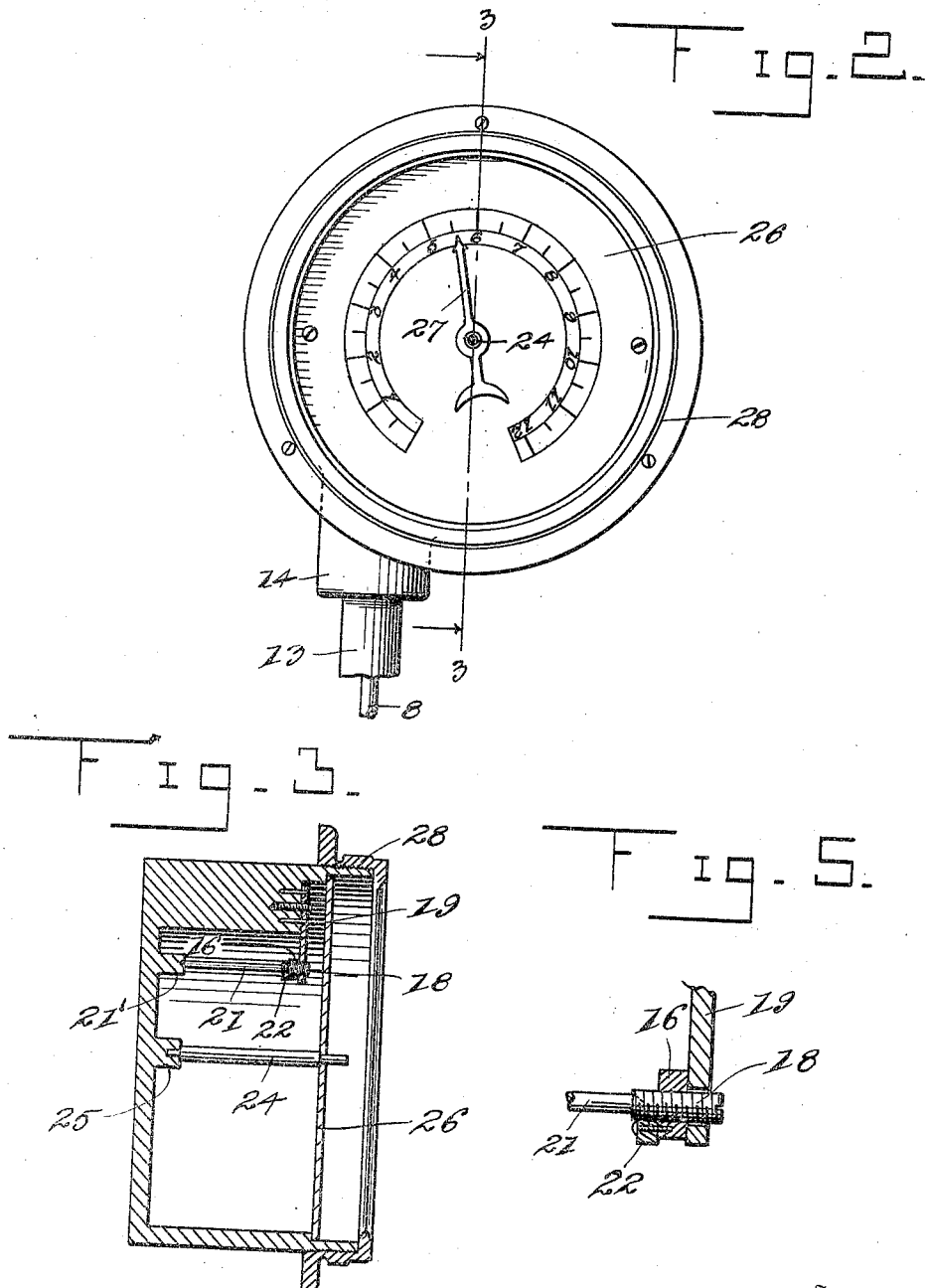

UNITED STATES PATENT OFFICE.

EARL R. YOUNG, OF BELOIT, WISCONSIN, ASSIGNOR OF ONE-HALF TO WILLIAM H. CORCORAN, OF BELOIT, WISCONSIN.

GASOLENE-GAGE FOR AUTOMOBILES.

1,121,441.  Specification of Letters Patent.  Patented Dec. 15, 1914.

Application filed December 13, 1913. Serial No. 306,523.

*To all whom it may concern:*

Be it known that I, EARL R. YOUNG, a citizen of the United States, residing at Beloit, in the county of Rock and State of Wisconsin, have invented certain new and useful Improvements in Gasolene-Gages for Automobiles; and I do hereby declare the following to be a full, clear, and exact description of the invention, such as will enable others skilled in the art to which it appertains to make and use the same.

This invention relates to gasolene gages for automobiles, and one of the principal objects of the invention is to provide simple, reliable and efficient means for indicating the quantity of gasolene in the fuel tank.

Another object of the invention is to provide a float chamber in a gage tank which communicates directly with the fuel tank and to provide means operated by a tube for indicating the quantity of gasolene in the fuel tank.

These and other objects may be attained by means of the construction illustrated in the acompanying drawings, in which, Figure 1 is a view in elevation and partial section of a gage made in accordance with this invention, Fig. 2 is a front elevation of the gage dial made on an enlarged scale, Fig. 3 is a sectional view taken on the line 3—3 of Fig. 2, looking in the direction indicated by the arrow, Fig. 4 is a sectional view taken on the line 4—4 of Fig. 1, Fig. 5 is a detail sectional view of the construction of the means for engaging the indicating hand, or means for operating the same.

Referring to the drawing the numeral 1 designates the gasolene tank such as is ordinarily used on an automobile, and leading from said tank is the fuel pipe 2. The gage casing or tank 3 is provided with an upper section 4, having an oil duct 5 which communicates with the fuel pipe 2, as shown in Fig. 1. An inner cylindrical casing 6 is mounted in the gage tank 3, said casing being spaced from the bottom of the tank 3, as shown at 7. A rod 8 carries a float 9 at its lower end and is pivoted in a guide collar 10 through which said rod extends, and the collar 10 is pivoted on an arm 11 pivoted in a recess in the outer wall of the projection 4, as shown at 12. A tubular support 13 is connected at its upper end to a threaded bar 14 disposed at one side of the indicator casing 15. Pivoted to the upper end of the rod 8 is an arm 16 pivotally connected to said rod 8 at 17 and rigidly connected at its inner end to a stub screw shaft 18, said shaft being supported upon a bracket 19 secured at 20 within the indicator casing. The screw 18 is supported by means of a pointed rod 21, said rod being connected to a boss 21' within the indicator casing. A bow 22 is rigidly connected to the screw shaft 18 and at the ends of said bow a twine cord 23 is connected, said cord extending once around a shaft 24 journaled at its rear end in a boss 25, while its front end is journaled in a dial 26 provided with indicating marks upon its face. A hand or pointer 27 is mounted on the reduced front end of the shaft 24. The indicator casing may be provided with a screw cap or cover 28. The guide collar 10 is pivotally connected at 10ᵃ to the rod 11.

The operation of the invention may be briefly described as follows:—A quantity of mercury *a* is placed within the indicator tank 3, and the gasolene constantly flowing through the duct 5 will force the mercury through the passage 7 underneath the inner casing 6 and as the float 9 rises it will operate the arm 16 which will turn the screw shaft 18 and rock the bow 20 which carries the cord 23 for operating the pointer shaft 24. The dial may be arranged to indicate the quantity of gasolene either in inches or gallons.

From the foregoing it will be obvious that a gage made in accordance with this invention will operate under varied conditions and is reliable, efficient and simple in construction and can be readily connected to any fuel tank of various types of automobiles.

What is claimed is:—

A gasolene gage comprising a gage tank, a float mounted in said tank, a rod connected to said float, an arm pivoted on said rod, a bow connected to said arm, a gage pointer, a shaft therefor, a string or cord connected to said bow and passing around the said shaft, and a dial upon which said pointer moves for indicating the quantity of gasolene in the fuel tank.

In testimony whereof I affix my signature in presence of two witnesses.

EARL R. YOUNG.

Witnesses:
 WAYNE L. COAKLEY,
 WM. H. TUTTLE.